US011263813B2

(12) United States Patent
Ohashi

(10) Patent No.: US 11,263,813 B2
(45) Date of Patent: Mar. 1, 2022

(54) INFORMATION PROCESSING DEVICE, INFORMATION PROCESSING SYSTEM, AND INFORMATION PROCESSING METHOD

(71) Applicant: Sony Interactive Entertainment Inc., Tokyo (JP)

(72) Inventor: Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/009,885

(22) Filed: Sep. 2, 2020

(65) Prior Publication Data

US 2021/0090329 A1  Mar. 25, 2021

(30) Foreign Application Priority Data

Sep. 19, 2019  (JP) .............................. JP2019-170720

(51) Int. Cl.
*G06T 19/00* (2011.01)
*G06T 7/70* (2017.01)
(52) U.S. Cl.
CPC .............. *G06T 19/003* (2013.01); *G06T 7/70* (2017.01)
(58) Field of Classification Search
CPC .................................. G06T 19/03; G06T 7/70

USPC ......................................................... 345/419
See application file for complete search history.

(56) References Cited

U.S. PATENT DOCUMENTS 10,796,489 B1 * 10/2020 Cordes .................... A63F 13/25
2013/0141419 A1 * 6/2013 Mount .................... A63F 13/25
345/419

* cited by examiner

*Primary Examiner* — Hai Tao Sun
(74) *Attorney, Agent, or Firm* — Katten Muchin Rosenman LLP

(57) ABSTRACT

Disclosed herein is an information processing device including an acquiring unit that acquires positional information of a flat surface present in a first space around a first user and positional information of a flat surface present in a second space around a second user, and a transformation parameter determining unit that determines a coordinate transformation parameter for transforming position coordinates of the first space and the second space into position coordinates in a virtual space such that a position of the flat surface present in the first space and a position of the flat surface present in the second space coincide with each other. A position of an object present in the first space and a position of another object present in the second space are transformed into positions in the virtual space according to the determined coordinate transformation parameter.

9 Claims, 5 Drawing Sheets

INFORMATION PROCESSING DEVICE, INFORMATION PROCESSING SYSTEM, AND INFORMATION PROCESSING METHOD

CROSS REFERENCE TO RELATED APPLICATIONS

This application claims the benefit of Japanese Priority Patent Application JP 2019-170720 filed Sep. 19, 2019, the entire contents of which are incorporated herein by reference.

BACKGROUND

The present disclosure relates to an information processing device, an information processing system, and an information processing method for performing processing relating to a virtual space.

In recent years, in a technology such as virtual reality or augmented reality, it has been studied to reflect, when a user moves his or her body in an actual world, the movement on, for example, an avatar in a virtual space. According to such a technology, the user moves his or her body in the actual world while viewing a state in the virtual space with a display device such as a head mounted display being mounted. This allows the user to, for example, touch an object present in the virtual space and to enjoy experiences in the virtual space with high presence.

SUMMARY

In the above-described technology, a plurality of users present in places spaced away from each other shares an identical virtual space in some cases. How to appropriately build the virtual space in such cases has not ever been studied sufficiently.

The present disclosure has been made in consideration of the above situation, and it is desirable to provide an information processing device, an information processing system, and an information processing method capable of suitably building a virtual space to be shared by a plurality of users present in different places.

According to an embodiment of the present disclosure, there is provided an information processing device including an acquiring unit that acquires positional information of a flat surface present in a first space around a first user and positional information of a flat surface present in a second space around a second user, and a transformation parameter determining unit that determines a coordinate transformation parameter for transforming position coordinates of the first space and the second space into position coordinates in a virtual space such that a position of the flat surface present in the first space and a position of the flat surface present in the second space coincide with each other. A position of an object present in the first space and a position of another object present in the second space are transformed into positions in the virtual space according to the determined coordinate transformation parameter.

According to another embodiment of the present disclosure, there is provided an information processing system including a plurality of client devices and a server device. The server device includes a flat surface position acquiring unit that acquires, from each of the plurality of client devices, positional information of a flat surface present in a space around a user of the client device, and a transformation parameter determining unit that determines a coordinate transformation parameter for transforming a position coordinate of a space around a user who uses corresponding one of the plurality of client devices into a position coordinate in a virtual space such that positions of the flat surfaces acquired from the plurality of client devices coincide with each other. Each of the plurality of client devices includes an object position acquiring unit that acquires a position coordinate of an object present in a space around a user who uses the client device, and a coordinate transformation unit that transforms the position coordinate of the object into a position in the virtual space according to the coordinate transformation parameter.

According to a further embodiment of the present disclosure, there is provided an information processing method including acquiring positional information of a flat surface present in a first space around a first user and positional information of a flat surface present in a second space around a second user, and determining a coordinate transformation parameter for transforming position coordinates of the first space and the second space into position coordinates in a virtual space such that a position of the flat surface present in the first space and a position of the flat surface present in the second space coincide with each other. A position of an object present in the first space and a position of another object present in the second space are transformed into positions in the virtual space according to the determined coordinate transformation parameter.

DETAILED DESCRIPTION OF THE PREFERRED EMBODIMENT

Hereinafter, an exemplary embodiment of the present disclosure will be described in detail with reference to the drawings.

Figure 1:
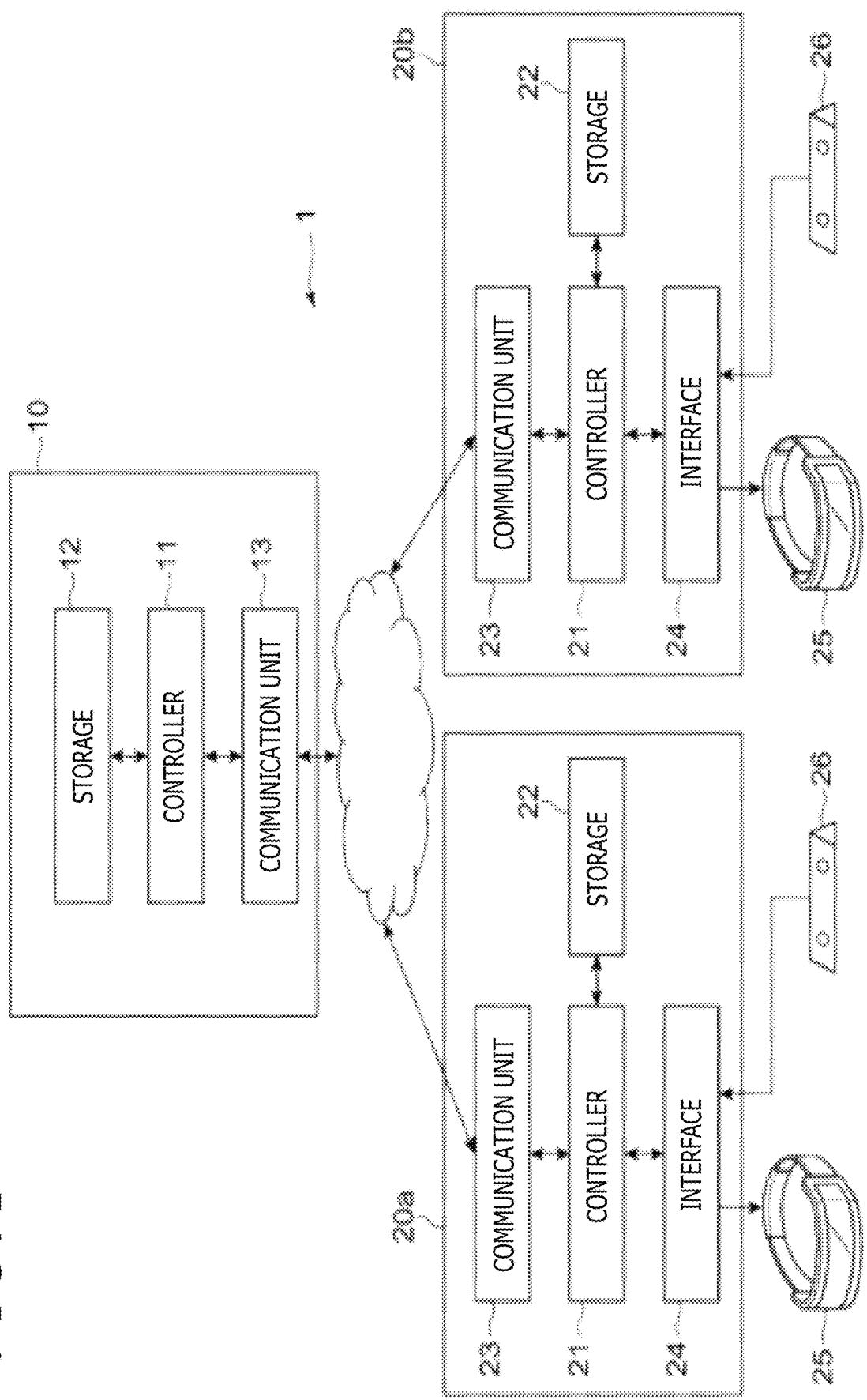
FIG. 1 is a schematic view of an entire information processing system including an information processing device according to an exemplary embodiment of the present disclosure.

FIG. 1 is a schematic view of an entire information processing system 1 including a server device 10 that is an information processing device according to the exemplary embodiment of the present disclosure. The information processing system 1 includes the server device 10 and a plurality of client devices 20 as illustrated in FIG. 1. Each of the plurality of client devices 20 is connected to the server device 10 through a communication network such as the Internet in a data-communicatable manner. Herein, as a specific example, it is assumed that the information processing system 1 includes two client devices 20 that are a client device 20a used by a user A and a client device 20b used by a user B. However, the information processing system 1 is not limited thereto and may include three or more client devices 20.

The server device 10 is an information processing device including a controller 11, a storage 12, and a communication unit 13. The controller 11 includes at least one processor and executes a program stored in the storage 12 to perform various kinds of information processing. A specific example of the processing performed by the controller 11 in the present exemplary embodiment will be described later. The storage 12 includes at least one memory device such as a random access memory (RAM) and stores the program to be executed by the controller 11 and data to be processed by the program. The communication unit 13 is a communication interface for performing data communication with each of the client devices 20 through the communication network.

Each of the client devices 20 includes a controller 21, a storage 22, a communication unit 23, and an interface 24. Further, each of the client devices 20 is connected with a display device 25 and a stereo camera 26. The controller 21 includes at least one processor and executes a program stored in the storage 22 to perform various kinds of information processing. A specific example of the processing performed by the controller 21 in the present exemplary embodiment will be described later. The storage 22 includes at least one memory device such as a RAM and stores the program to be executed by the controller 21 and data to be processed by the program. The communication unit 23 is a communication interface for performing data communication with the server device 10 through the communication network.

The interface 24 is an interface for performing data communication with the display device 25 and the stereo camera 26. The client device 20 is wiredly or wirelessly connected to the display device 25 and the stereo camera 26 through the interface 24. Specifically, the interface 24 includes a multimedia interface such as high-definition multimedia interface (HDMI) (registered trademark) to transmit data of moving images depicted by the client device 20 to the display device 25. Further, the interface 24 includes a data communication interface such as a universal serial bus (USB) to receive a video signal transmitted from the stereo camera 26.

The display device 25 is a device that displays a moving image to be presented to the user. In the present exemplary embodiment, the display device 25 is assumed to be a head mounted display device to be mounted on the user's head to use. Specifically, the display device 25 can display a three-dimensional video using parallax while presenting a right-eye image to the right eye of the user and presenting a left-eye image to the left eye of the user.

The stereo camera 26 includes a plurality of imaging elements disposed in an array. The client device 20 can measure a distance from an imaging position to an object present in a viewing-field range of the stereo camera 26 by analyzing an image captured by each of these imaging elements. This allows the client device 20 to estimate a position or a shape of an object present in a space around the stereo camera 26.

Figure 2A:
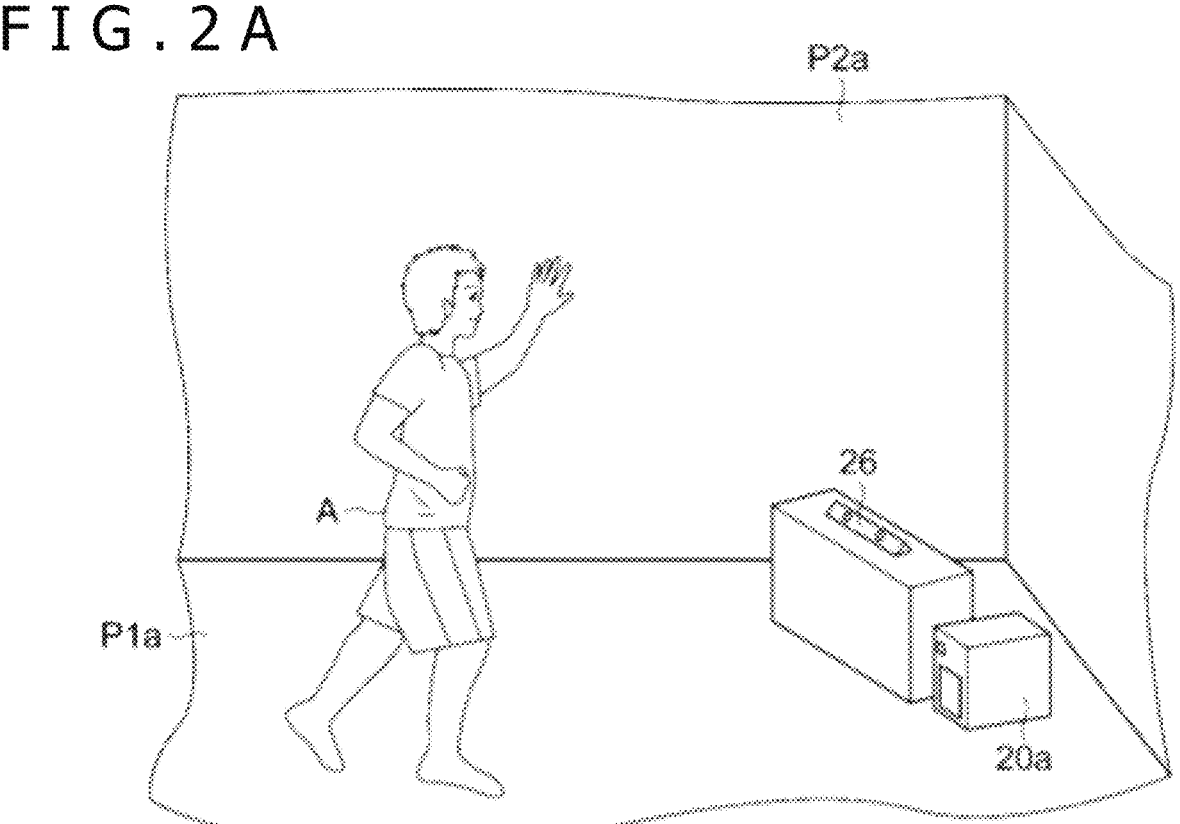
FIGS. 2A and 2B are views illustrating examples of a state of an actual space where a user is present.
Figure 2B:
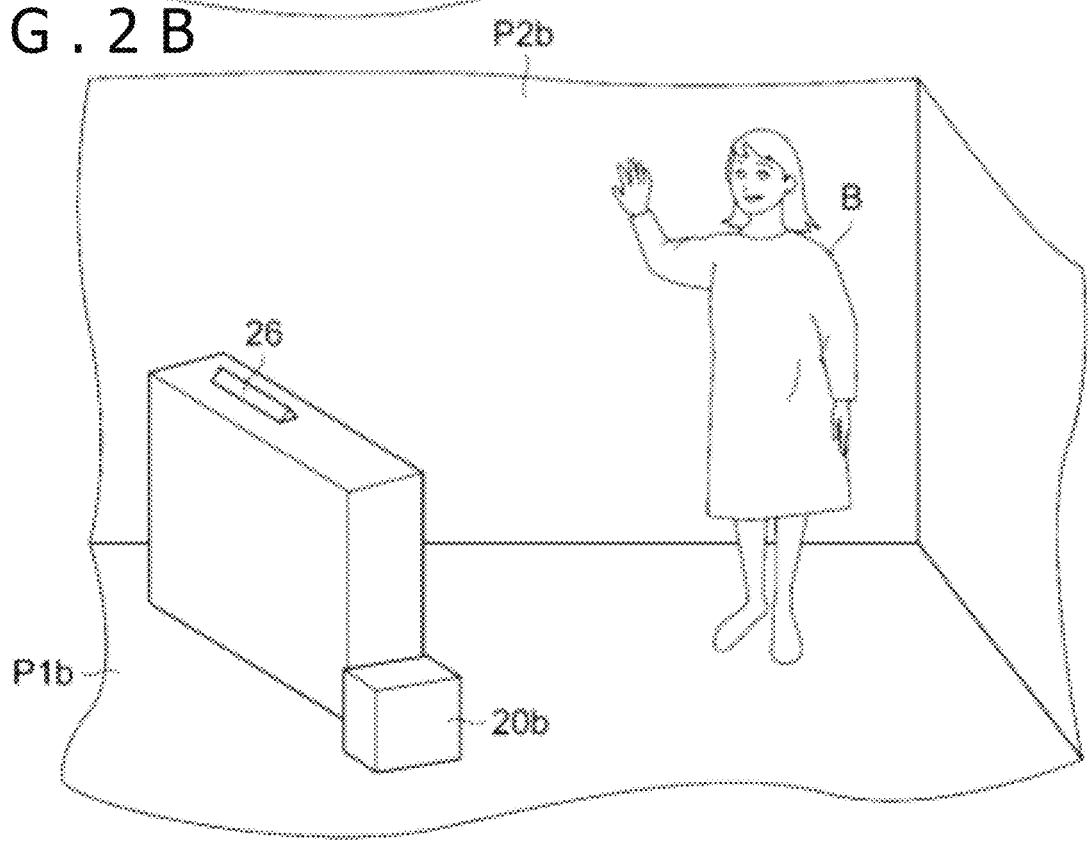

Particularly, in the present exemplary embodiment, the stereo camera 26 is used for identifying positions of a user who uses the client device 20 and an object present around the user, such as a wall or a floor. FIGS. 2A and 2B are views each illustrating a state in which each user uses the client device 20. FIG. 2A illustrates a state of the user A, and FIG. 2B illustrates a state of the user B. In the examples in FIGS. 2A and 2B, the stereo camera 26 is disposed in front of the user A with the display device 25 mounted, and a viewing-field range of the stereo camera 26 includes the user A standing in front, a floor surface on which the user A stands, and a wall surface of a room where the user A is present, for example. Similarly to the user A, the user B also uses the client device 20b in his or her room, and a viewing-field range of the stereo camera 26 connected to the client device 20b includes the user B, and a floor surface and a wall surface around the user B.

Figure 3:
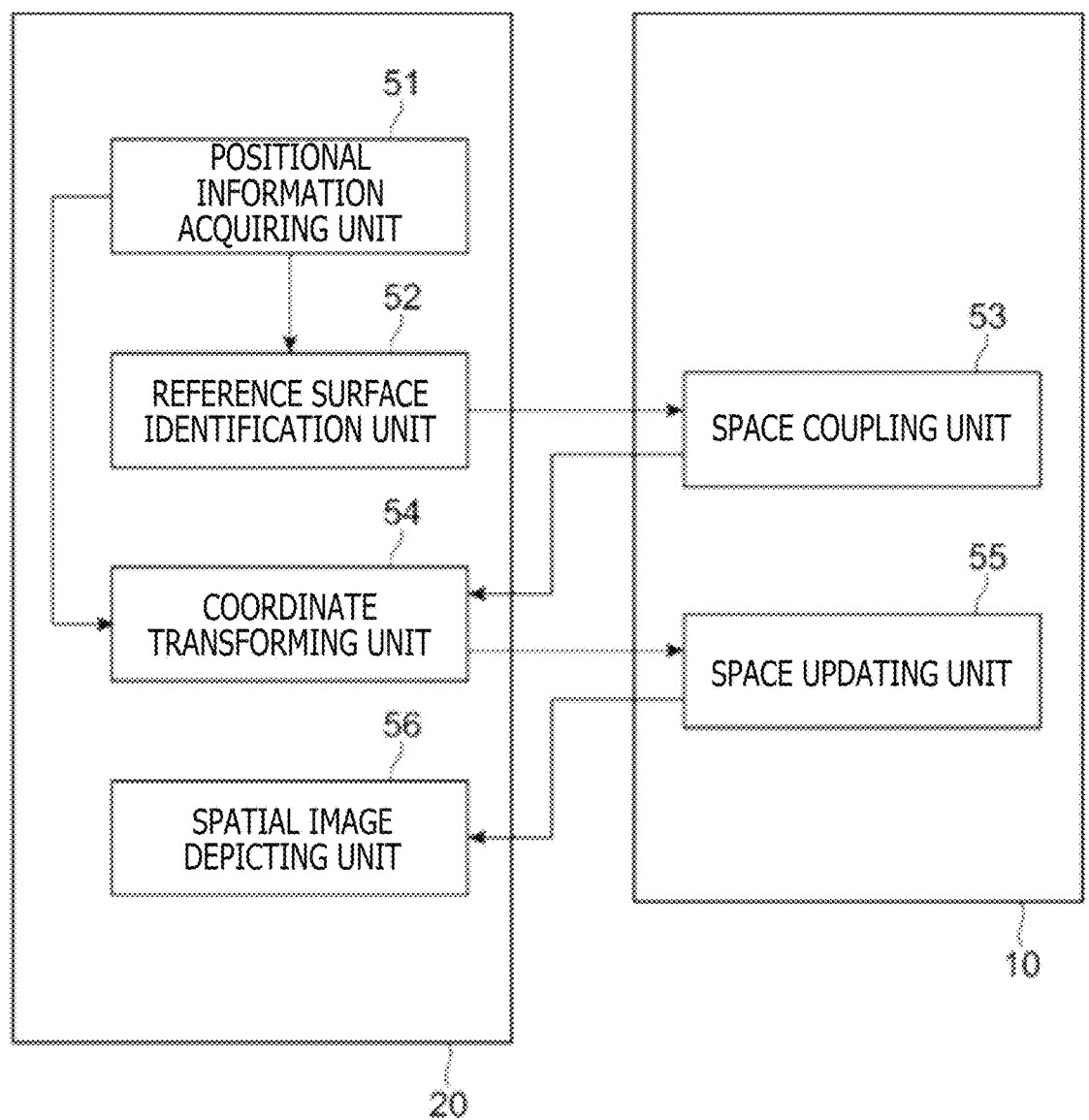
FIG. 3 is a functional block diagram illustrating functions of the information processing system.

Functions to be implemented by the information processing system 1 will be described with reference to FIG. 3. In the present exemplary embodiment, the information processing system 1 provides a service allowing a plurality of users to mutually interact in a virtual space. As illustrated in FIG. 3, the information processing system 1 functionally includes a positional information acquiring unit 51, a reference surface identification unit 52, a space coupling unit 53, a coordinate transforming unit 54, a space updating unit 55, and a spatial image depicting unit 56. Among these functions, the positional information acquiring unit 51, the reference surface identification unit 52, the coordinate transforming unit 54, and the spatial image depicting unit 56 are implemented by the controller 21 of each client device 20 executing the program stored in the storage 22. The space coupling unit 53 and the space updating unit 55 are implemented by the controller 11 of the server device 10 executing the program stored in the storage 12. These programs may be provided to the respective devices through the communication network such as the Internet or may be provided by being stored in a computer-readable non-transitory recording medium such as an optical disk.

The positional information acquiring unit 51 acquires information that identifies positions of the user and an object present around the user in the actual space. In the present exemplary embodiment, the positional information acquiring unit 51 analyzes images captured by the stereo camera 26 to identify a position of an object present in the imaging range of the stereo camera 26. The positional information acquired by the positional information acquiring unit 51 is used to identify a reference surface by the reference surface identification unit 52 to be described later and is also used to update a virtual space by the space updating unit 55 to be described later.

More specifically, with respect to each of a plurality of unit regions obtained by dividing the imaging range of the stereo camera 26 in a grid pattern, the positional information acquiring unit 51 calculates a distance to a portion of an object captured in each unit region. This allows the positional information acquiring unit 51 to acquire a distance image (depth map) including information of a distance to an object captured in each unit region. Hereinafter, a portion, of the object present in the actual space, captured in each unit region in the distance image is referred to as a unit portion.

Furthermore, the positional information acquiring unit 51 calculates position coordinates of each unit portion in the actual space using numerical values of a position of the unit region in the distance image (i.e., a direction of the unit region viewed from an installation position of the stereo camera 26) and a distance to a unit portion captured in the unit region. These position coordinates serve as a three-dimensional position coordinates in a coordinate system that defines the installation position of the stereo camera 26 as a reference position. By using the position coordinates of each of the plurality of unit portions thus acquired, a position or a shape of an object having a complicated structure, such as the body of the user or a table, can be identified. Hereinafter, a coordinate system indicating positions in the actual space where the user is present with the position of the stereo camera 26 as the reference position is referred to as a local coordinate system. Further, a coordinate system indicating positions in an actual space around the user A (first space) is referred to as a first local coordinate system, and a coordinate system indicating positions in an actual space around the user B (second space) is referred to as a second local coordinate system.

The reference surface identification unit 52 identifies a position of the reference surface in the actual space by use of the positional information of the object which is acquired by the positional information acquiring unit 51. Herein, the reference surface is a flat surface serving as a reference when spaces are coupled, which will be described later. The reference surface identification unit 52 extracts a region where a plurality of unit portions are continuously disposed along an identical flat surface by use of the position coordinates of each unit portion which are acquired by the positional information acquiring unit 51, thereby to identify the flat surface configured with such unit portions as the reference surface.

Specifically, the reference surface identification unit 52 identifies one horizontal surface as the reference surface. For example, the reference surface may be a floor surface on which the user stands. Alternatively, in a case where an object whose upper surface is flat such as a table is present in a location where the user is present, the upper surface may be identified as the reference surface.

Note that it is assumed that each of the plurality of client devices 20 identifies a surface whose relative position (height) to the user is close as the reference surface. For example, in a case where the client device 20a defines a floor surface in the location where the user A is present as the reference surface, the client device 20b also identifies a floor surface in the location where the user B is present as the reference surface. In contrast, in a case where the plurality of users shares a table in the virtual space, for example, the reference surface identification unit 52 of each client device 20 identifies an upper surface of an actual table present close to the user as the reference surface.

To achieve such control, the reference surface identification unit 52 of each client device 20 may accept, in advance, specification of a condition regarding what height of the horizontal surface should be used as the reference surface from the server device 10 and may identify a flat surface that satisfies the condition as the reference surface. For example, in a case where the reference surface identification unit 52 accepts specification for defining the floor surface as the reference surface, the reference surface identification unit 52 defines a flat surface configured with a unit portion present at a lowest position as the reference surface. In a case where the reference surface identification unit 52 accepts specification for defining a table surface as the reference surface, the reference surface identification unit 52 may first identify a position of the head of the user and a position of the floor surface from a distribution of unit portions and then define a flat surface present in a predetermined height range between the head of the user and the floor surface as the reference surface.

Furthermore, the reference surface identification unit 52 may identify a vertical surface such as a wall surface as the reference surface in addition to the horizontal surface such as the floor surface. Herein, it is assumed that each user uses the client device 20 in the room, and the reference surface identification unit 52 identifies, as the reference surface, at least one of some of four wall surfaces in the room where the user is present. Note that, hereinafter, the horizontal surface identified as the reference surface is referred to as a horizontal reference surface, and the vertical surface identified as the reference surface is referred to as a vertical reference surface. It is assumed that the reference surface identification unit 52 typically identifies one horizontal reference surface and further identifies one or more vertical reference surfaces if possible. For example, in the examples illustrated in FIGS. 2A and 2B, the reference surface identification unit 52 of the client device 20a identifies a floor surface P1a and a wall surface P2a as the reference surfaces. Further, the reference surface identification unit 52 of the client device 20b identifies a floor surface P1b and a wall surface P2b as the reference surfaces. The vertical reference surface may be a reference surface adjacent to the horizontal reference surface or may be a reference surface present at a position closest to the position of the user.

After identifying the position of the reference surface in the actual space, the reference surface identification unit 52 transmits the positional information to the server device 10. This positional information is represented by coordinate values indicating a position of a flat surface in the local coordinate system.

The space coupling unit 53, as a flat-surface position acquiring unit, builds the virtual space by use of information of the reference surfaces transmitted from each client device 20. More specifically, the space coupling unit 53 determines coordinate transformation parameters for coupling the actual spaces where the users of the client devices 20 are individually present to build the virtual space. The coordinate transformation parameters are parameters for transforming the local coordinate system used for representing the positional information of the object acquired by each client device 20 into a coordinate system indicating a position in the virtual space (herein, referred to as a world coordinate system). The positional information of the object acquired by each client device 20 is transformed into the position in the world coordinate system by use of the coordinate transformation parameters, which enables the plurality of users to share one virtual space.

Herein, the space coupling unit 53 configures a transformation parameter determining unit that determines the coordinate transformation parameters such that at least the horizontal reference surfaces in the spaces where the plurality of users are individually present coincide with each other. The position coordinates of the horizontal reference surfaces in the local coordinate systems are different from each other due to, for example, a difference between the installation positions of the stereo cameras 26 connected to the respective client devices 20. The space coupling unit 53 determines the coordinate transformation parameters to be transmitted to the respective client devices 20 so as to cancel this difference. The coordinate transformation parameters in this case at least include a parameter for a parallel motion along a vertical direction for causing the horizontal reference surfaces to coincide with each other.

Furthermore, in a case where each of the client devices 20 transmits the positional information of the vertical reference surface, the space coupling unit 53 may couple the spaces such that the vertical reference surfaces at least partly coincide with each other. As an example, in a case where each of the client devices 20 transmits the positional information of the floor surface and one wall surface, the space coupling unit 53 determines the coordinate transformation parameters for parallelly moving and/or rotating each local coordinate system such that the respective wall surfaces coincide with each other in addition to the floor surfaces. Depending on the local coordinate system used by each client device 20, the coordinate transformation parameters may include a parameter for performing transformation such as mirror image inversion.

Alternatively, in a case where each of the client devices 20 transmits information of three reference surfaces (i.e., one horizontal reference surface and two vertical reference surfaces) that surround one corner and cross each other, the space coupling unit 53 may determine the coordinate transformation parameters for each coordinate system such that all the three reference surfaces respectively coincide with each other. Note that, since sizes or shapes of the rooms where the respective users are present are generally different from each other, all the reference surfaces identified by the client devices 20 can not necessarily coincide with each other. Therefore, the space coupling unit 53 causes at least the horizontal reference surfaces to coincide with each other and determines the coordinate transformation parameters for each local coordinate system to further cause one or two vertical reference surfaces to coincide with each other if possible.

For example, in the example mentioned above, it is assumed that positional information of an adjacent wall surface P3a adjacent to the wall surface P2a in addition to the floor surface P1a and the wall surface P2a is acquired from the client device 20a, and positional information of an adjacent wall surface P3b adjacent to the wall surface P2b in addition to the floor surface P1b and the wall surface P2b is acquired from the client device 20b. In this case, the space coupling unit 53 determines the coordinate transformation parameters to at least cause the floor surface P1a and the floor surface P1b to coincide with each other and cause the wall surface P2a and the wall surface P2b to coincide with each other. Furthermore, in a case where an angle formed by the wall surface P2a and the adjacent wall surface P3a in the first space and an angle formed by the wall surface P2b and the adjacent wall surface P3b in the second space coincide with each other, the coordinate transformation parameters are determined to also cause the adjacent wall surface P3a and the adjacent wall surface P3b to coincide with each other. In contrast, in a case where the angles formed by the two sets of wall surfaces do not coincide with each other, since it is difficult to achieve coordinate transformation causing all the three reference surfaces to respectively coincide with each other, the space coupling unit 53 determines the coordinate transformation parameters to only cause the floor surface P1a and the floor surface P1b coincide with each other and cause the wall surface P2a and the wall surface P2b to coincide with each other.

The space coupling unit 53 transmits the coordinate transformation parameters for each local coordinate system determined as described above to the corresponding client device 20. The coordinate transforming unit 54 of each client device 20 performs the coordinate transformation on the position coordinates of the object acquired by the positional information acquiring unit 51 by use of the coordinate transformation parameters received from the space coupling unit 53 of the server device 10. This allows the coordinate transforming unit 54 to transform the position coordinates of each of the plurality of unit portions in the local coordinate system identified in the actual space into the position coordinates in the virtual space in the world coordinate system.

Note that the coordinate transforming unit 54 does not necessarily transform position coordinates of all the unit portions acquired by the positional information acquiring unit 51. For example, the coordinate transforming unit 54 may omit transformation of position coordinates of unit portions configuring the reference surface. Alternatively, the coordinate transforming unit 54 may identify unit portions configuring the body of the user according to a given algorithm to transform the position coordinates of the unit portions. Information of the transformed position coordinates is transmitted to the server device 10.

The space updating unit 55 functions as a virtual space builder and updates details of the virtual space by use of the information of the position coordinates of the object received from each client device 20. Specifically, the space updating unit 55 disposes an avatar Aa representing the user A in the virtual space by use of the position coordinates, which are received from the client device 20a, of each unit portion configuring the user A. Further, the space updating unit 55 disposes an avatar Ab representing the user B in the virtual space by use of the position coordinates, which are received from the client device 20b, of each unit portion configuring the user B. Herein, the position coordinates received from each client device 20 are the position coordinates in the world coordinate system after being transformed according to the coordinate transformation parameters determined by the space coupling unit 53. Therefore, a position and a posture of the avatar to be disposed in the virtual space can be determined by use of the received position coordinates without change.

The avatar of each user thus disposed is updated while reflecting the posture and the movement of the user in the actual space. Herein, the coordinates of the position of each user is transformed by use of the coordinate transformation parameters determined by the space coupling unit 53. This allows the avatars of the plurality of users to share a horizontal reference surface having an identical height. For example, in a case where the floor surface of the room where each user is present is identified as the horizontal reference surface, the avatars of the users are disposed in the virtual space so as to stand on the floor surface having the identical height.

Alternatively, in a case where an upper surface of a table is identified as the horizontal reference surface, the space coupling unit 53 determines the coordinate transformation parameters such that the horizontal reference surfaces of the local coordinate systems coincide with each other as described above. In this case, the space updating unit 55 disposes a table object such that its upper surface coincides with a position, in the virtual space, corresponding to the horizontal reference surface. This allows the plurality of users to share the table having the identical height in the virtual space. In other words, when the user A touches the upper surface of the table present in his or her room with his or her hand, the avatar of the user A also touches the upper surface of the table object disposed in the virtual space with its hand. Similarly, when the user B touches the upper surface of the table present in his or her room with his or her hand, the avatar of the user B can touch the upper surface of the identical table object disposed in the virtual space with its hand. Herein, even when heights of the tables actually present in the rooms where the respective users are present are different from each other, the coordinate transformation is performed such that the upper surfaces of the tables coincide with each other. This allows the identical table object to be shared in the virtual space. Therefore, each of two users can touch the table object or a virtual object disposed on the table object in the virtual space, for example, as if the table in his or her room is shared with the other user who is present in a remote place.

In a case where the space coupling unit 53 determines the coordinate transformation parameters so as to share one or more vertical reference surfaces, the space updating unit 55 disposes wall surface objects at positions, in the virtual space, corresponding to the vertical reference surfaces. This allows each of the plurality of users to share one or more wall surfaces in the virtual space with another user who is present in a remote location similarly to the floor surface or the upper surface of the table.

Figure 4:
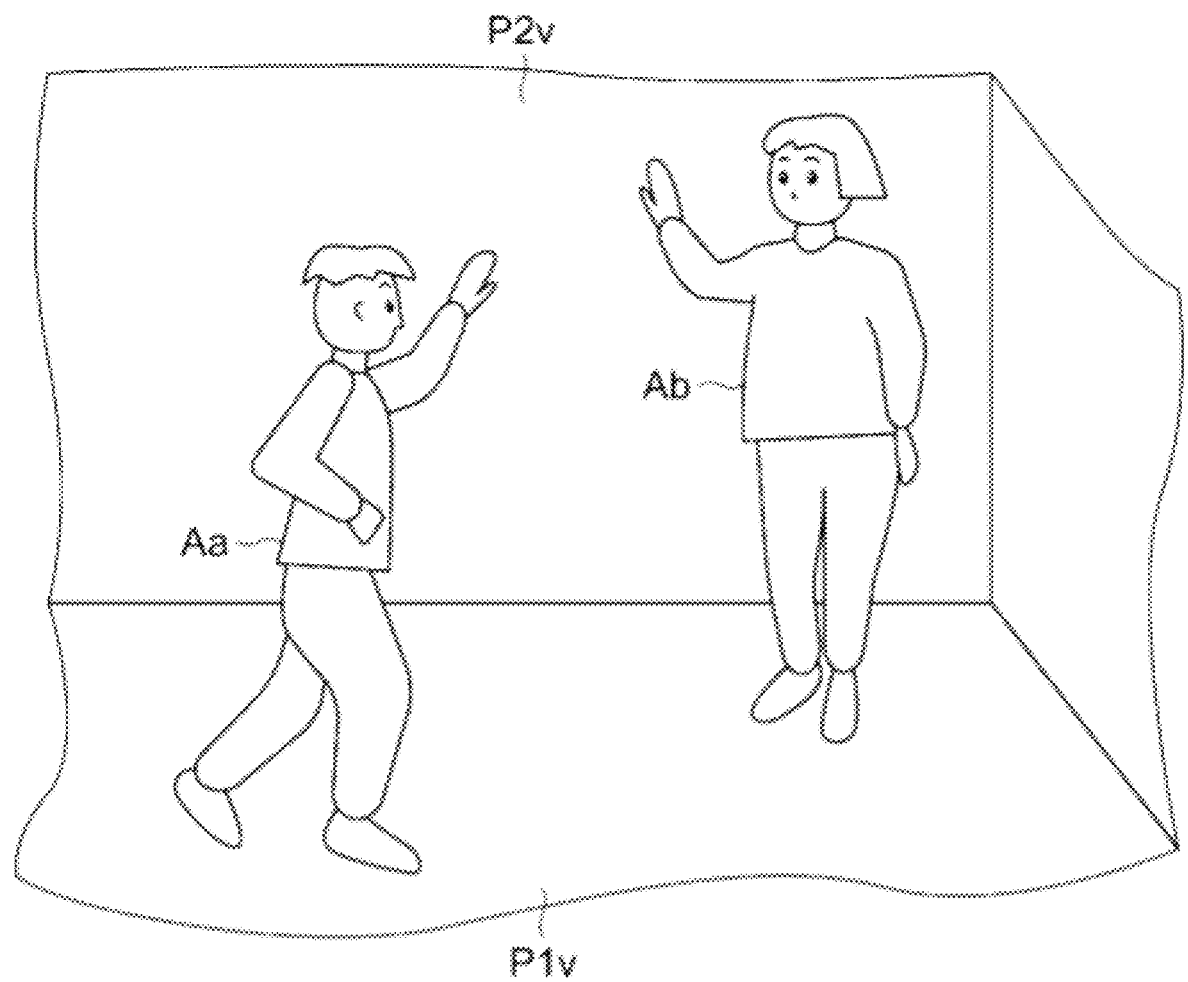
FIG. 4 is a view illustrating an example of a state of a virtual space.

FIG. 4 is a view illustrating a state of the virtual space updated by the space updating unit 55 in this manner. In the example in FIG. 4, the avatar Aa representing the user A and the avatar Ab representing the user B are disposed in one virtual space. Furthermore, the coordinate transformation parameters are determined such that the floor surface P1a in a space where the user A is actually present and the floor surface P1b in a space where the user B is actually present coincide with each other, and such that the wall surface P2a in the space where the user A is present and the wall surface P2b in the space where the user B is present coincide with each other. With this configuration, in the virtual space, a floor surface P1v corresponds to both the floor surface P1a and the floor surface P1b, and a wall surface P2v corresponds to both the wall surface P2a and the wall surface P2b. Therefore, when the user A touches the wall surface P2a with his or her hand in the actual space, the avatar Aa touches the wall surface P2v with its hand, and when the user B touches the wall surface P2b with his or her hand in the actual space, the avatar Ab touches the wall surface P2v with its hand. With this configuration, when the user A and the user B perform an operation in the actual space such as tracing the wall surface present nearby with his or her hand, for example, the user A and the user B can depict characters or pictures on the wall surface P2v in the virtual space.

Note that, herein, it is assumed that the avatars representing the plurality of users are disposed on the same side with respect to the vertical reference surface in the virtual space. However, the plurality of avatars may be disposed on opposite sides with respect to one vertical reference surface. For example, in a case where two persons play tennis, they face each other over a net, and it is not assumed that each person enters a court on the opposite side. In a case where such a situation is reproduced, the space coupling unit 53 determines the coordinate transformation parameters for each client device 20 such that the vertical reference surfaces identified by the two client devices 20 reversely coincide with each other in the virtual space (i.e., such that surfaces of the vertical reference surfaces directed to corresponding users are opposite to each other). By disposing the avatar of each user in the virtual space according to the position coordinates in the world coordinate system transformed with such coordinate transformation parameters, the user can stand facing the wall in the room where the user is present and face the avatar of the other user present on the opposite side of the wall in the virtual space.

The space updating unit 55 may also determine a position, a shape, and a size of another virtual object disposed in the virtual space by use of the information of the position coordinates of the unit portions received from each client device 20, in addition to the avatar of each user. For example, in a case where a cabinet is placed in the room where the user A is present, the space updating unit 55 disposes a virtual object having a shape similar to that of the cabinet also in the virtual space. Such control can prevent each user from entering a location where the object is present in the actual space.

In a case where a wall surface other than the surface selected, by the space coupling unit 53, as the reference surface to be shared is present, the space updating unit 55 may dispose a wall surface object corresponding to the wall surface in the virtual space. Specifically, for example, in a case where one wall surface is identified as the vertical reference surface, a position of a wall surface facing this wall surface in the actual space varies depending on the size of the room where each user is present. In this case, the space updating unit 55 disposes the wall surface object at a position, in the virtual space, corresponding to a wall surface closest to the reference surface among wall surfaces facing the reference surface in the room where each user is present. This can restrict a movable range recognized by each user in the virtual space according to the size of a narrower room of the rooms where respective users are actually present. With this configuration, it can be produced that no one can enter a space where any one of the plurality of users cannot enter.

The space updating unit 55 delivers information of each virtual object disposed in the virtual space based on information of an object, which is received from each client device 20, to each client device 20. The spatial image depicting unit 56 of each client device 20 depicts a spatial image indicating a state in the virtual space by use of the information received from the space updating unit 55 and causes the display device 55 to display the spatial image. At this time, the space updating unit 55 identifies a position of the head of the user who views the displayed spatial image and disposes a virtual camera at a position where the identified position is transformed into the world coordinate system. The spatial image depicting unit 56 depicts a spatial image indicating a state of the inside of the virtual space viewed from the disposed virtual camera. This allows each user to view the state of the inside of the virtual space shared with another user who is present in a remote location. This spatial image may include an avatar representing another user.

Figure 5:
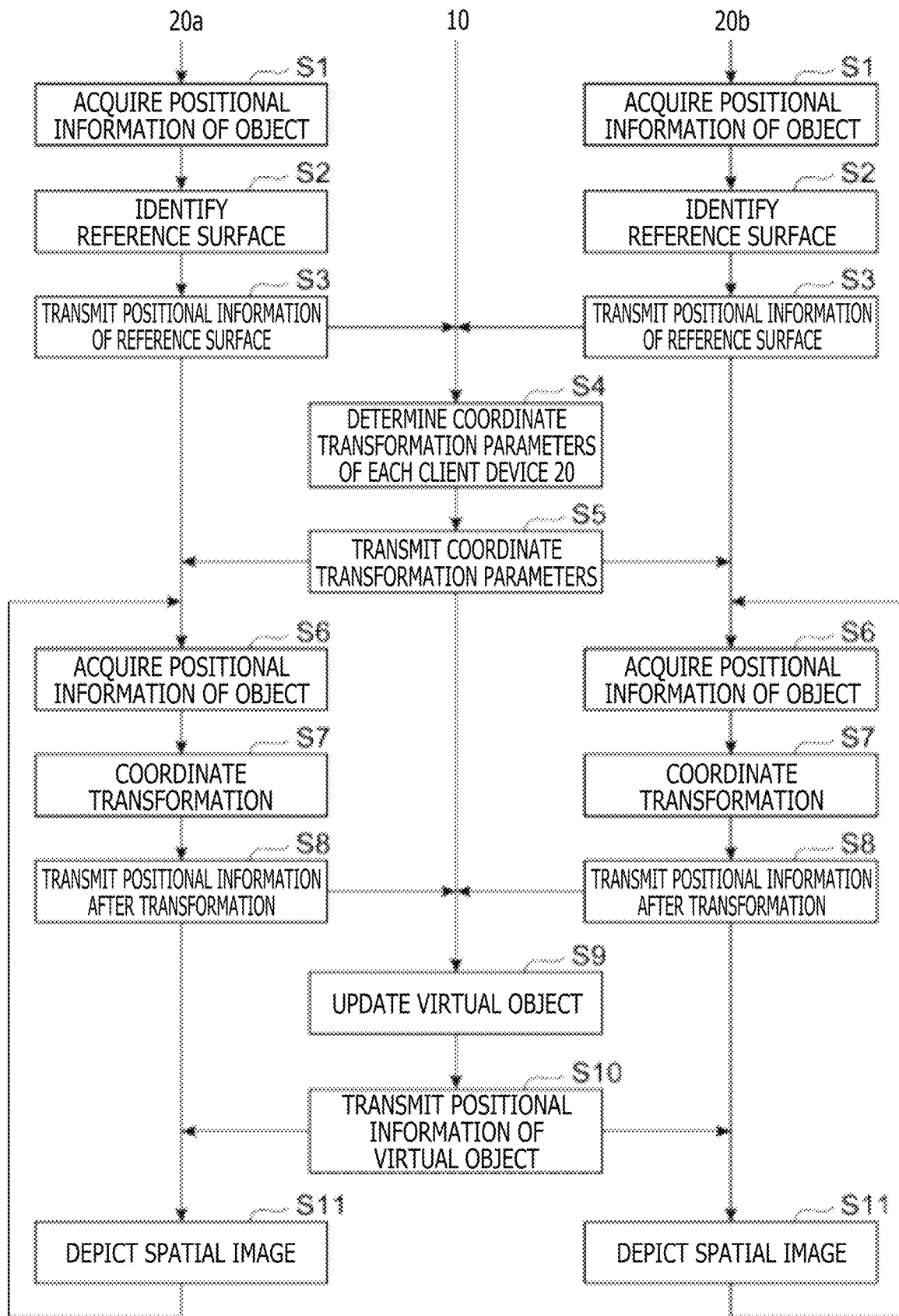
FIG. 5 is a flow diagram illustrating an example of a flow of processing performed by the information processing system.

Hereinafter, an example of a flow of processing performed by the information processing system 1 will be described using a flow diagram in FIG. 5.

First, as initial processing, the positional information acquiring unit 51 of each client device 20 acquires positional information of an object around the user (S1). The positional information acquiring unit 51 then identifies a position of a reference surface in each local coordinate system by use of the acquired positional information (S2). The positional information of the identified reference surface is transmitted to the server device 10 (S3).

The space coupling unit 53 of the server device 10 determines the coordinate transformation parameters for transforming the local coordinate system of each client device 20 into the world coordinate system by use of the positional information of the reference surface, which is transmitted from each client device 20 in S3 (S4). As described above, the space coupling unit 53 determines the coordinate transformation parameters used by each client device 20 such that the positions of the reference surfaces transmitted from the client devices 20 coincide with each other in the virtual space. The space coupling unit 53 transmits the coordinate transformation parameters determined in S4 to each client device 20 (S5), thereby terminating the initial processing.

Hereinafter, the information processing system 1 repeats acquisition of the positional information of each user and update of the virtual space according to the acquired positional information. Specifically, the positional information acquiring unit 51 of each client device 20 acquires positional information of current objects including at least the body of the user (S6). The coordinate transforming unit 54 transforms the positional information acquired in S6 into the position coordinates in the world coordinate system by use of the coordinate transformation parameters received in S5 (S7) and transmits information of the transformed position coordinates to the server device 10 (S8).

The space updating unit 55 of the server device 10 updates information of a virtual object to be disposed in the virtual space by use of the position coordinates received from each client device 20 in S8 (S9). Specifically, the space updating unit 55 updates at least a position and a posture of an avatar corresponding to each user by use of the positional information of the user, which is received in S8. Thereafter, the space updating unit 55 transmits positional information of each virtual object in the updated virtual space to each client device 20 (S10).

The spatial image depicting unit 56 of each client device 20 depicts a spatial image indicating a state of the inside of the virtual space by use of the positional information of the virtual object received in S10 and causes the display device 25 to display the spatial image (S11). By repeating the processing from S6 to S11, a state of the virtual space where a plurality of avatars each of which reflects movement of the body of the corresponding user are present can be presented to each user.

According to the above-described exemplary embodiment of the present disclosure, the coordinate transformation is performed according to the coordinate transformation parameters determined such that the reference surfaces identified in the places where the users are individually present coincide with each other. Therefore, each user can share the reference surface in the place where he or she is present with another user present in a remote place in one virtual space. With this configuration, each user can share the identical virtual space with another user present in the remote place and, at the same time, achieve interaction in which each user and another user touch and operate an identical object in the virtual space. Such a technology can be used for room-scaled communication by a plurality of persons, by use of desks or walls, such as a remote meeting system.

Note that exemplary embodiments of the present disclosure are not limited to the exemplary embodiment described above. For example, in the above description, the images captured by the stereo camera 26 are used to identify the positions of the user and the reference surface present around the user. However, the exemplary embodiments are not limited to this configuration, and the client device 20 may use, for example, a time-of-flight (TOF) type sensor to detect positions of objects present in the actual space. Alternatively, movement of the user or the positions of the objects present around the user may be identified by use of, for example, the simultaneous localization and mapping (SLAM) technology according to movement of an image captured by a camera mounted on the display device 25. Alternatively, the positions of the objects may be detected using a technology such as Patterned Stereo or Structured Light. Furthermore, the client device 20 may identify the position of the user and the position of the reference surface by combining detection results of a plurality of sensor devices disposed in the actual space.

In the above description, the coordinate transformation from the local coordinate system to the world coordinate system is performed for each unit portion identified using the image captured by the stereo camera 26. However, the coordinate transformation may be performed with another unit. For example, the client device 20 may estimate a skeleton model of the body of the user using the image captured by the stereo camera 26 and may perform the coordinate transformation on position coordinates of feature points configuring the estimated skeleton model.

Alternatively, at least part of processing to be performed by the client device 20 in the above description may be performed by the server device 10. As an example, the coordinate transformation from the position coordinates in the local coordinate system to the position coordinates in the world coordinate system may be performed by the server device 10. In this case, the server device 10 need not transmit the coordinate transformation parameters to each client device 20. In contrast, at least part of processing to be performed by the server device 10 in the above description may be performed by the client device 20. Alternatively, any one of the plurality of client devices 20 may also function as the server device 10 in the above description.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
   an acquiring unit that acquires positional information of:
      a first horizontal surface, a first vertical surface, and a first adjacent vertical surface adjacent to the first vertical surface present in a first space around a first user;
      a second horizontal surface, a second vertical surface, and a second adjacent vertical surface adjacent to the second vertical present in a second space around a second user; and
   a transformation parameter determining unit that determines a coordinate transformation parameter for transforming position coordinates of the first space and the second space into position coordinates in a virtual space such that:
   wherein, in a case where an angle formed by the first adjacent vertical surface and the first vertical surface and an angle formed by the second adjacent vertical surface and the second vertical surface coincide with each other, the transformation parameter determining unit determines the coordinate transformation parameter such that:
      the first horizontal surface and the second horizontal surface coincide with each other,
      the first vertical surface and the second vertical surface coincide with each other, and
      the first adjacent vertical surface and the second adjacent vertical surface coincide with each other, and
   wherein, in a case where the angle formed by the first adjacent vertical surface and the first vertical surface and the angle formed by the second adjacent vertical surface and the second vertical surface do not coincide with each other, the transformation parameter determining unit determines the coordinate transformation parameter only such that:
      the first horizontal surface and the second horizontal surface coincide with each other, and
      the first vertical surface and the second vertical surface coincide with each other, wherein a position of an object present in the first space and a position of another object present in the second space are transformed into positions in the virtual space according to the determined coordinate transformation parameter.

2. The information processing device according to claim 1, wherein the first horizontal surface and the second horizontal surfaces are flat surfaces.

3. The information processing device according to claim 1,
wherein the acquiring unit acquires positional information of a plurality of flat surfaces present in the first space and positional information of a plurality of flat surfaces present in the second space, and
the transformation parameter determining unit determines the coordinate transformation parameter such that the plurality of flat surfaces present in the first space and the plurality of flat surfaces present in the second space respectively coincide with each other.

4. The information processing device according to claim 1, wherein the transformation parameter determining unit determines the coordinate transformation parameter such that a surface on a first user side of the first vertical surface and a surface on a second user side of the second vertical surface face opposite to each other.

5. The information processing device according to claim 1, further comprising:
a virtual space building unit that builds a virtual space including a reference surface corresponding to the first horizontal surface present in the first space and the second horizontal surface present in the second space,
wherein the first horizontal surface and the second horizontal surface have a different size,
wherein the virtual space building unit restricts a movable range of a user in the virtual space to a range corresponding to a narrower space than the first horizontal surface or the second horizontal surface.

6. An information processing system comprising:
a plurality of client devices; and
a server device,
wherein the server device includes
an acquiring unit that acquires, from each of the plurality of client devices, positional information of:
a horizontal surface present in a space around a user of the client device,
a vertical surface present in the space around the user of the client device, and
an adjacent vertical surface in the space around the user of the client device; and
a transformation parameter determining unit that determines a coordinate transformation parameter for transforming a position coordinate of a space around a user who uses corresponding one of the plurality of client devices into a position coordinate in a virtual space such that:
for each of the plurality of client devices where an angle formed by the vertical surface and the adjacent vertical surface coincide with each other, the coordinate transformation parameter is determined such that
the horizontal surfaces present in the spaces coincide,
the vertical surfaces present in the spaces coincide, and
the adjacent vertical surfaces present in the spaces coincide, and
for each of the plurality of client devices where an angle formed by the vertical surface and the adjacent vertical surface do not coincide with each other, the coordinate transformation parameter is determined only such that
the horizontal surfaces present in the spaces coincide, and
the vertical surfaces present in the spaces coincide.

7. An information processing method comprising:
acquiring positional information of:
a first horizontal surface, a first vertical surface, and a first adjacent vertical surface adjacent to the first vertical surface present in a first space around a first user a second horizontal surface, a second vertical surface, and a second adjacent vertical surface adjacent to the second vertical present in a second space around a second user; and
determining a coordinate transformation parameter for transforming position coordinates of the first space and the second space into position coordinates in a virtual space such that:
wherein, in a case where an angle formed by the first adjacent vertical surface and the first vertical surface and an angle formed by the second adjacent vertical surface and the second vertical surface coincide with each other, the coordinate transformation parameter is determined such that:
the first horizontal surface and the second horizontal surface coincide with each other,
the first vertical surface and the second vertical surface coincide with each other, and
the first adjacent vertical surface and the second adjacent vertical surface coincide with each other, and
wherein, in a case where the angle formed by the first adjacent vertical surface and the first vertical surface and the angle formed by the second adjacent vertical surface and the second vertical surface do not coincide with each other, the coordinate transformation parameter is determined only such that:
the first horizontal surface and the second horizontal surface coincide with each other, and
the first vertical surface and the second vertical surface coincide with each other
wherein a position of an object present in the first space and a position of another object present in the second space are transformed into positions in the virtual space according to the determined coordinate transformation parameter.

8. An information processing device comprising:
an acquiring unit that acquires positional information of:
a first vertical surface and a first adjacent vertical surface facing the first vertical surface present in a first space around a first user, and
a second vertical surface and a second adjacent vertical surface facing the second vertical present in a second space around a second user; and
a transformation parameter determining unit that determines a coordinate transformation parameter for transforming position coordinates of the first space and the second space into position coordinates in a virtual space such that:
the first vertical surface and the second vertical surface coincide with each other at a first wall surface in the virtual space, and
wherein, in a case that a distance d1 between the first vertical surface and the first adjacent vertical surface is greater than a distance d2 between the second vertical surface and the second adjacent vertical surface, a second wall surface is set the distance d2 from and facing the first wall surface in the virtual space,
wherein, in a case that the distance d2 is greater than the distance d1, the second wall surface is set the distance d1 from and facing the first wall surface in the virtual space.

9. The information processing device of claim 8,
wherein the acquiring unit further acquires positional information of a first horizontal surface in the first space and a second horizontal surface in the second space, and wherein the transformation parameter determining unit determined the coordinate transformation parameter such that the first horizontal surface coincides with the second horizontal surface.

* * * * *